United States Patent

Takaku et al.

[11] Patent Number: 5,241,480
[45] Date of Patent: Aug. 31, 1993

[54] METHOD AND APPARATUS FOR DETECTING COMBUSTION CONDITIONS IN MULTICYLINDER INTERNAL COMBUSTION ENGINE BASED UPON ENGINE SPEED EVALUATION

[75] Inventors: Yutaka Takaku; Mineo Kashiwaya; Toshio Ishii, all of Katsuta; Naoyuki Tanaka, Tsuchiura, all of Japan

[73] Assignee: Hitachi, Ltd., Tokyo, Japan

[21] Appl. No.: 638,452

[22] Filed: Jan. 4, 1991

[30] Foreign Application Priority Data

Jan. 8, 1990 [JP] Japan .................................. 2-509
Feb. 26, 1990 [JP] Japan ................................ 2-42458

[51] Int. Cl.⁵ .......................................... G01M 15/00
[52] U.S. Cl. ............................ 364/431.08; 364/431.07; 364/565; 73/116; 123/436; 123/419
[58] Field of Search ...................... 364/431.01, 431.07, 364/431.08, 565, 431.03, 431.04; 123/436, 419, 416, 417, 418; 73/116, 117.3, 119 R, 35, 117.2

[56] References Cited

U.S. PATENT DOCUMENTS

| | | | |
|---|---|---|---|
| 4,520,449 | 5/1985 | Johnson et al. | 364/431.08 X |
| 4,525,781 | 6/1985 | Konomi et al. | 364/431.01 |
| 4,532,592 | 7/1985 | Citron et al. | 364/431.05 |
| 4,550,595 | 11/1985 | Venema | 73/116 |
| 4,627,399 | 12/1986 | Yoshida et al. | 123/419 |
| 4,691,286 | 1/1987 | Obayashi et al. | 364/431.04 |
| 4,691,288 | 9/1987 | Kay et al. | 364/431.01 X |
| 4,693,077 | 9/1987 | Skarvan et al. | 123/436 X |
| 4,697,561 | 10/1987 | Citron | 123/436 X |
| 4,705,000 | 11/1987 | Matsumura et al. | 123/419 X |
| 4,843,870 | 7/1989 | Citron et al. | 73/116 |
| 4,870,585 | 9/1989 | Manzolini | 364/431.03 |
| 4,936,277 | 6/1990 | Deutsch et al. | 123/436 |
| 5,016,591 | 5/1991 | Nanyoshi et al. | 123/419 |
| 5,157,965 | 10/1992 | Koegeler et al. | 73/116 |

FOREIGN PATENT DOCUMENTS

| | | |
|---|---|---|
| 0406765 | 9/1991 | European Pat. Off. . |
| 58-51243 | 3/1983 | Japan . |
| 9007051 | 6/1990 | PCT Int'l Appl. . |

Primary Examiner—Thomas G. Black
Assistant Examiner—Thomas S. Auchterlonie
Attorney, Agent, or Firm—Ladas & Parry

[57] ABSTRACT

A method and apparatus for detecting the quality of combustion in each cylinder of a multi-cylinder internal combustion engine is disclosed. The invention determines a combustion stroke of each cylinder by sensors and detects the rotational speed of the engine at least three times during each combustion stroke by a rotation speed calculation device. The detected rotational speeds are evaluated by an arithmetic calculation device to identify the variation in rotational speed of each piston during a combustion stroke whereby the quality of combustion is, thus, determined. In a feature of the invention fluctuations in rotational speed caused by reciprocating inertia ($\omega_c$) are calculated and eliminated from fluctuation in engine speed caused by combustion ($\omega_g$) so that the quality of combustion based only upon variation in detected speeds caused by combustion is derived.

7 Claims, 8 Drawing Sheets

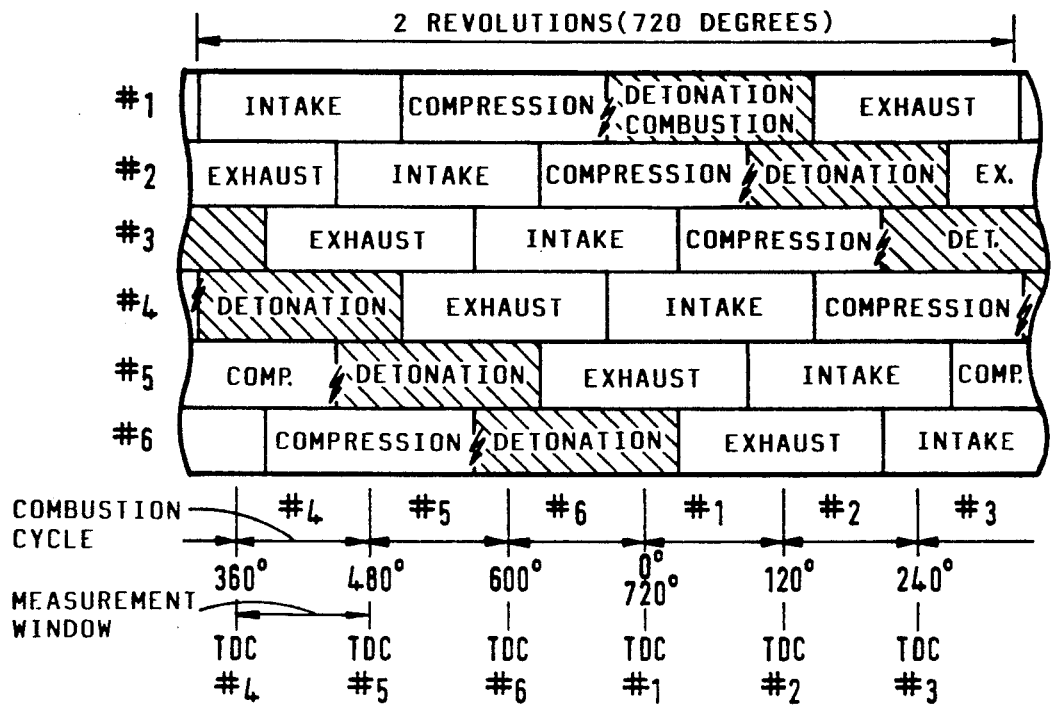
Fig.5
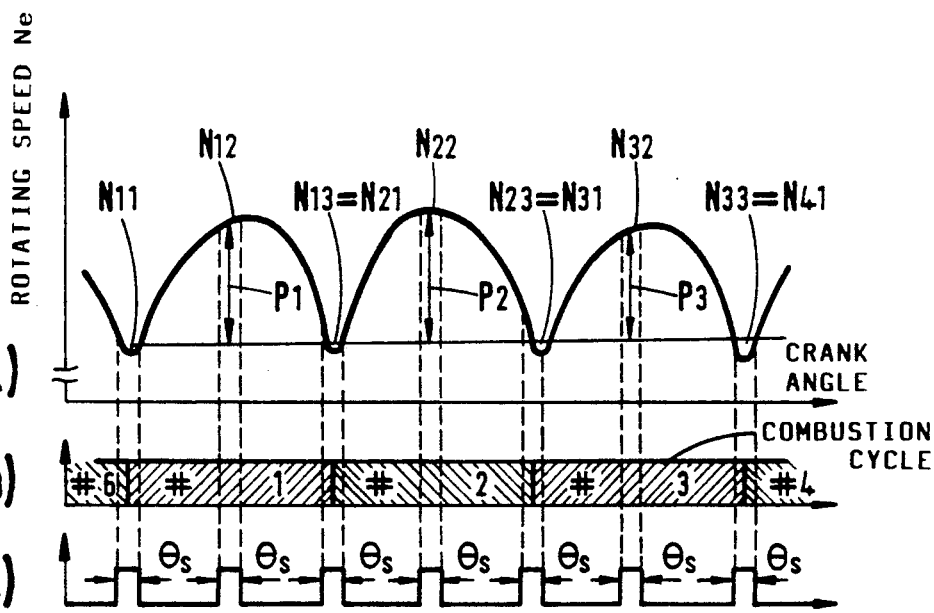
Fig.6(a)
Fig.6(b)
Fig.6(c)

METHOD AND APPARATUS FOR DETECTING COMBUSTION CONDITIONS IN MULTICYLINDER INTERNAL COMBUSTION ENGINE BASED UPON ENGINE SPEED EVALUATION

BACKGROUND OF THE INVENTION

Field of the Invention

This invention relates to a method and apparatus for detecting an operational condition or state of an internal combustion engine having a plurality of cylinders, and particularly to a method and apparatus for detecting quality of combustion state in each cylinder of a multi-cylinder internal combustion engine.

DESCRIPTION OF RELATED ART

Internal combustion engines having a plurality of cylinders known in the prior art, have problems and disadvantages due to the rotational variation caused by the irregularity in output between each one of a plurality of cylinders. In an attempt to solve these problems, as disclosed in Japanese Patent Laid-Open No. 58-51243 (1983), it is proposed that the combustion state in an internal combustion engine having a plurality of cylinders be determined first by detecting rotating speeds at two points in the combustion stroke for each cylinder, then by calculation obtaining a rotating speed variation which is the difference in detected rotating speeds between the two measurement intervals. In the above prior art, the combustion state in the internal combustion engine with a plurality of cylinders has been determined for each cylinder, based on an arithmetic averaging calculation of deviation of the rotating speed.

In the prior art, however, because there has been no specific consideration for differences in rotating speed variation occurring under various operational conditions, or due to crankshaft vibration, it has been difficult to precisely determine the combustion state in an internal combustion engine relative to its various operational conditions. That is, according to the prior art, it has been necessary to set up discrimination threshold values corresponding to various operational conditions of an internal combustion engine. However, the setting up of such discrimination threshold values itself has been very difficult, and even if they had been set up successfully, it has been difficult to detect an abnormal combustion state in each cylinder owing to various effects such as torsional vibration of the crankshaft, for example.

In consideration of the problems and disadvantages associated with the prior art technology, the object of the present invention is to provide a method and apparatus for detecting the quality of combustion in an internal combustion engine having a plurality of cylinders, which method and apparatus enable a precise determination of combustion in each cylinder in the internal combustion engine.

In Japanese Patent Laid-Open No. 62-228128, there is described a means for determining a cylinder combustion condition by measuring the fluctuation in rotation at two different points in a combustion stroke and calculating the piston kinetic energy using the square of the fluctuating speeds at the two measuring points.

Such technology presumes that the rotating speed variation is caused mostly by combustion energy, and does not take into consideration a variation or fluctuation component due to reciprocating inertia, such as by pistons and the like, thereby causing a large error in detection especially at a high rotational speed, or causing failure to properly determine a combustion state. In this respect, at high rotational speeds, the rotational fluctuation is mostly caused by reciprocating component inertia.

In other words, rotational speed variation occurring in a single ignition cycle in an internal combustion engine is partly due to a torque change caused by the combustion, but, as is often the case with present day internal combustion engines for an automobile provided with reciprocating pistons, a torque change is also caused by reciprocating inertia, consequently leading to a rotation speed variation. Still further, a torque change is caused by the mechanism for actuating the intake and exhaust valves. Furthermore, a torque change occurs due to switching on and off heavy electrical load items such as an air-conditioner compressor.

An object of a feature of this invention is to provide combustion state detection method and apparatus for detecting a precise combustion state from the variation in rotation speed.

SUMMARY OF THE INVENTION

According to one aspect of this invention there is provided a method of detecting the quality of combustion in each cylinder of a multi-cylinder internal combustion engine comprising the steps of determining a combustion stroke of each cylinder, detecting the rotational speed of said engine at least three times during each combustion stroke, and evaluating the detected rotational speeds to provide an indication of the quality of combustion based upon the variation of the detected speeds.

By the present invention it is possible to accurately detect the quality of combustion in a multi-cylinder engine even when the engine is under load, thereby overcoming the disadvantages noted in the prior art.

Preferably, the engine rotational speeds are detected proximate to the beginning and end of each cylinder combustion stroke and at a time intermediate thereof. Conveniently, the engine rotational speeds are detected at top dead centre of a first cylinder, at top dead centre of a second cylinder which is the next cylinder to said first cylinder to fire, and at a time intermediate the top dead centre of said first and second cylinders. Advantageously, said intermediate time is approximately half way between the top dead centre of said first and second cylinders.

Preferably, the evaluating step comprises determining the curvilinear nature of the detected rotating speeds between the first and last detected speeds in a combustion stroke, and evaluating the amount by which the curve changes to thereby determine the quality of combustion.

In one embodiment the rotational speeds are detected at the beginning and end of a combustion stroke and at an intermediate point thereof, and the height of the rotational speed characteristic at said intermediate point above an imagined straight line drawn between the rotational speeds at the beginning and end of combustion is indicative of the quality of combustion.

In a further embodiment the rotational speeds are detected at the beginning and end of a combustion stroke and at an intermediate point thereof, and the area under the rotational speed characteristic relative to an imagined straight line drawn between the rotational speeds at the beginning and end of combustion is indicative of the quality of combustion.

In a feature of this invention variation in engine rotational speed caused by reciprocating inertia is substantially eliminated at said evaluating step to provide an indication of the quality of combustion based substantially only upon variation in detected speeds caused by combustion.

According to another aspect of this invention there is provided an apparatus for detecting the quality of combustion in each cylinder of a multi-cylinder internal combustion engine comprising determining means adapted to determine a combustion stroke of each cylinder and to supply a signal representative thereof to a detecting means adapted to detect the rotational speed of said engine at least three times during each combustion stroke and to provide an output indicative thereof, and evaluating means adapted to evaluate the output of said detecting means for providing an indication of the quality of combustion based upon the variation of the detected rotational speeds.

Preferably, the determining means includes a crankshaft angular position sensor means adapted to provide an output signal at (a) top dead centre of a first cylinder, (b) at top dead centre of a second cylinder which is the next cylinder to said first cylinder to fire, and (c) at a time intermediate the top dead centre of said first and second cylinders.

In a preferred feature of this invention there is provided compensating means adapted to determine a compensating signal indicative of reciprocating inertia at each detected rotational speed and said compensating means is arranged to apply said compensating signal to said evaluating means so that an indication of the quality of combustion is provided based substantially only upon variation in detected speeds caused by combustion.

Advantageously, said compensating means includes memory means adapted to store coefficient data for calculating engine rotation fluctuation caused by reciprocating inertia, and said evaluating means includes a processing means arranged to calculate variation in detected rotational speed less said engine rotation fluctuation caused by reciprocating inertia.

Conveniently, said memory means is also adapted to store data representative of engine rotation fluctuation caused by elastic forces.

BRIEF DESCRIPTION OF THE DRAWINGS

The invention will now be described by way of example with reference to the accompanying drawings in which:

FIG. 5 shows combustion strokes of respective cylinders in an internal combustion engine provided with the apparatus of this invention, FIGS. 6(a) to (c) show waveforms for explaining the principle of the means for detecting various combustion states.

In the Figures, like reference numerals denote like parts.

DESCRIPTION OF PREFERRED EMBODIMENTS

Various operating conditions within an internal combustion multi-cylinder engine will now be described with reference to FIGS. 1(a)–1(c). In these Figures a four-cylinder engine is assumed and the ignition points of each cylinder are denoted by a staggered arrow-headed line. The ordinate in each of the FIGS. 1(a)-1(c) is revolutions per minute (RPM) and may be considered in the graphical figures of FIGS. 1(a)-1(c) to be incremental change in RPM.

Figure 1A:
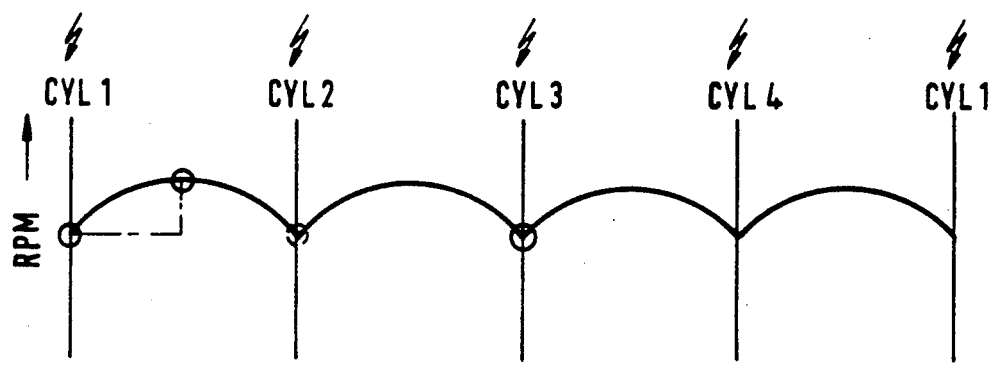
FIGS. 1(a) to 1(c) graphically show various engine operating states.

FIG. 1(a) shows a multi-cylinder internal combustion engine in which the firing stroke occurs normally. In this respect, at each firing stroke the cylinder RPM is increased due to the action of firing to a peak mid-way between firing of the next cylinder. FIG. 1(c) shows an instance where a mis-fire occurs in the cylinder 1 but normal firing occurs in cylinders 2, 3 and 4. It will be noted that when there is a mis-fire the RPM of the crankshaft diminishes but then subsequently picks up with normal firing of cylinder 2. Figure(c) shows an instance where normal firing occurs but that because of change in torque, for example increasing load, the trend of RPM diminishes.

Figure 1B:
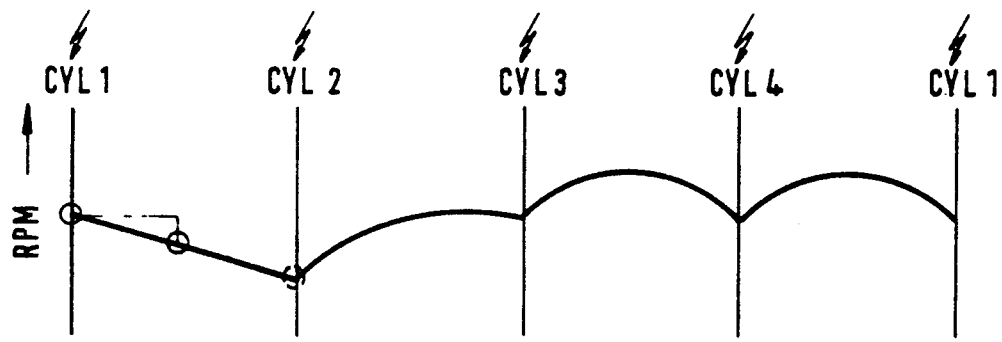
Figure 1C:
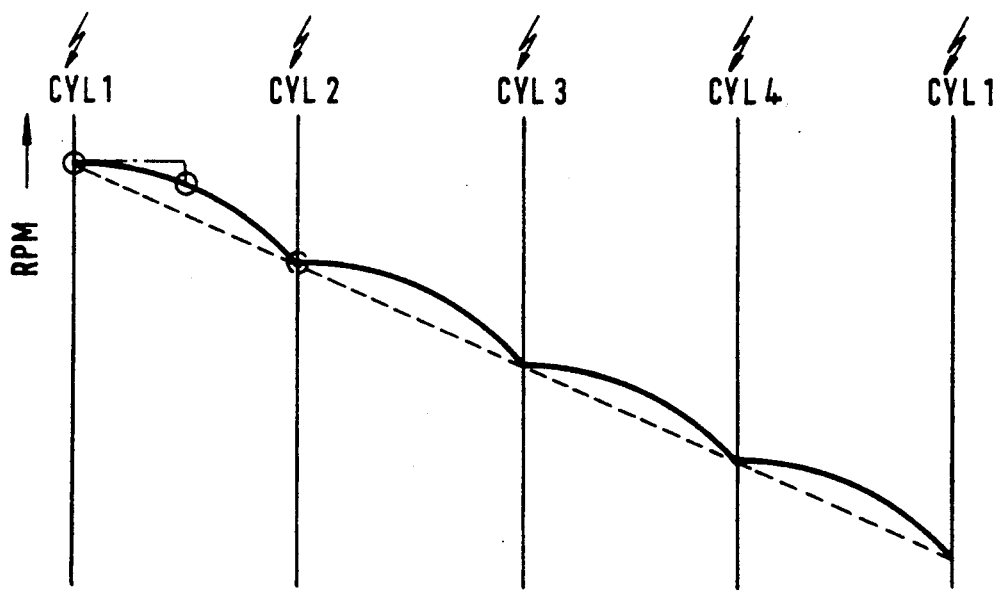

In the prior art of Japanese Patent Laid-Open No. 58-51243 (1983) where only two points in a combustion cycle of each cylinder are measured, as shown by the chain broken line in each of the FIGS. 1(a)-(c), it will be noted that in FIG. 1(a) a positive gradient between the measuring points (shown encircled), but in FIG. 1(b) where there is a mis-fire in cylinder 1, a negative gradient is measured. These measurement points are acceptable for the conditions shown in FIGS. 1(a) and 1(b) but are unacceptable in the condition shown in FIG. 1(c). In this respect, in FIG. 1(c) normal firing occurs but because of the increase of load torque a negative gradient is still measured. An incorrect measurement is, thus, made. However, if as occurs in the present invention, a third measurement point is taken, as shown by the broken circle at the firing point of cylinder 2, then it is possible to determine whether the curve between the cylinder firing points is convex or not which denotes the quality of cylinder firing since the height of the curve is directly proportional to the energy of combustion. Although in the above example the measurement was taken at the point of firing, preferably the first and third measurement points are taken relative to top dead centre of cylinders 1 and 2 and the intermediate measurement point is taken at some point within the combustion cycle. That is a measurement window is 120 degrees for a six-cylinder engine and 180 degrees for an eight-cylinder engine. In the following "cylinder" is denoted by "#".

Figure 2:
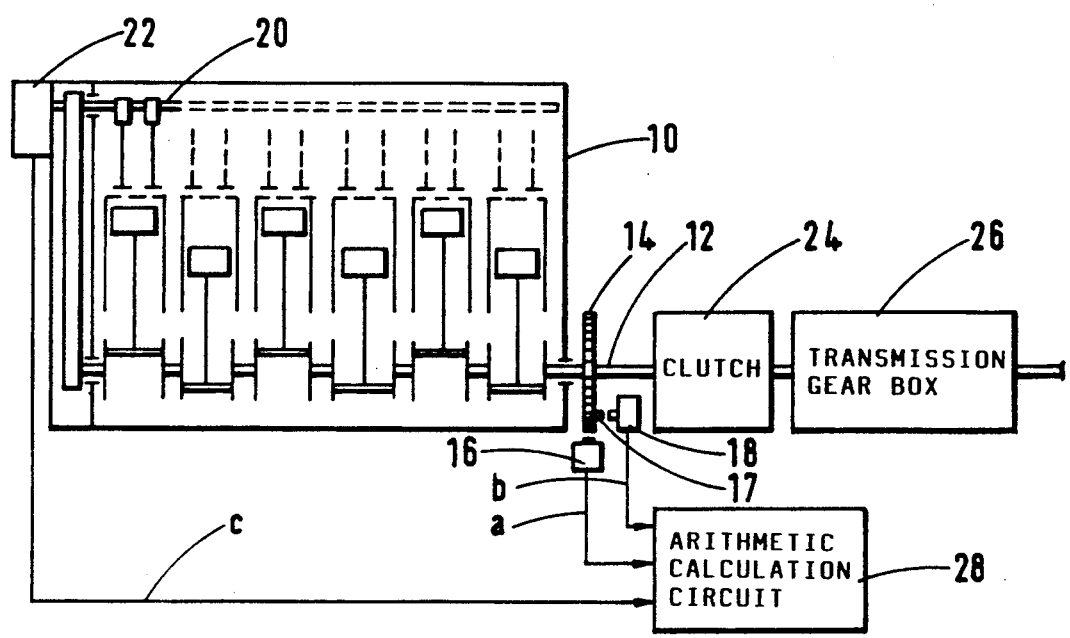
FIG. 2 shows in schematic form a combustion quality detection apparatus in accordance with this invention.

In FIG. 2 an internal combustion engine 10 has a crankshaft 12 connecting a plurality of cylinders, for example, six cylinders and a ring gear 14 is secured to one end of the crankshaft. Opposed to the teeth face of the ring gear 14 is a first magnetic pick-up 16 for producing signal output a Thereby, the first magnetic pick-up 16 generates as many pulse waveform output signals at the number of the teeth of the ring gear 14 per single revolution of the crankshaft. It is to be understood that the invention is not intended to be limited to a ring gear sensor and other sensors known per se may be used. In addition, on a side of the ring gear 14 (on the right hand side in FIG. 2), a protruding portion 17 is formed. Opposing the protruding portion 17, more specifically to the right hand side of the ring gear 14, a second magnetic pick-up 18 is disposed. As is clear from the above structure, the second magnetic pick-up 18 generates a pulse output signal b once per rotation (360 degree) of the crankshaft 12. A cam shaft 20 is provided in the upper portion of the internal combustion engine 10 for closing and opening the values of each cylinder. On one end of the cam shaft 20, a cam angle sensor 22 is installed to detect the rotation angle of the cam shaft and which generates one output pulse signal c per two rotations of the crankshaft 12.

The crankshaft 12 of the internal combustion engine 10 is connected through a clutch 24 and a transmission gear box 26 to drive wheels (not shown in FIG. 2) in the same manner as practised in a conventional drive mechanism.

The output signals from the first magnetic pick-up sensor 16, the second pick-up sensor 18 and the cam angle sensor 22, are inputted to an arithmetic circuit 28, which configuration will be described later in detail, wherein a rotation speed and a crank angle at a given instant of operation of the internal combustion engine are calculated. Detection of the rotating speed is, however, not limited to the use of the ring gear 14, and may also be accomplished by detecting a rotating speed of the crankshaft 12, for example, by installing another type of sensor different from the above ring gear 14 on the crankshaft 12, for example.

Figure 3A:
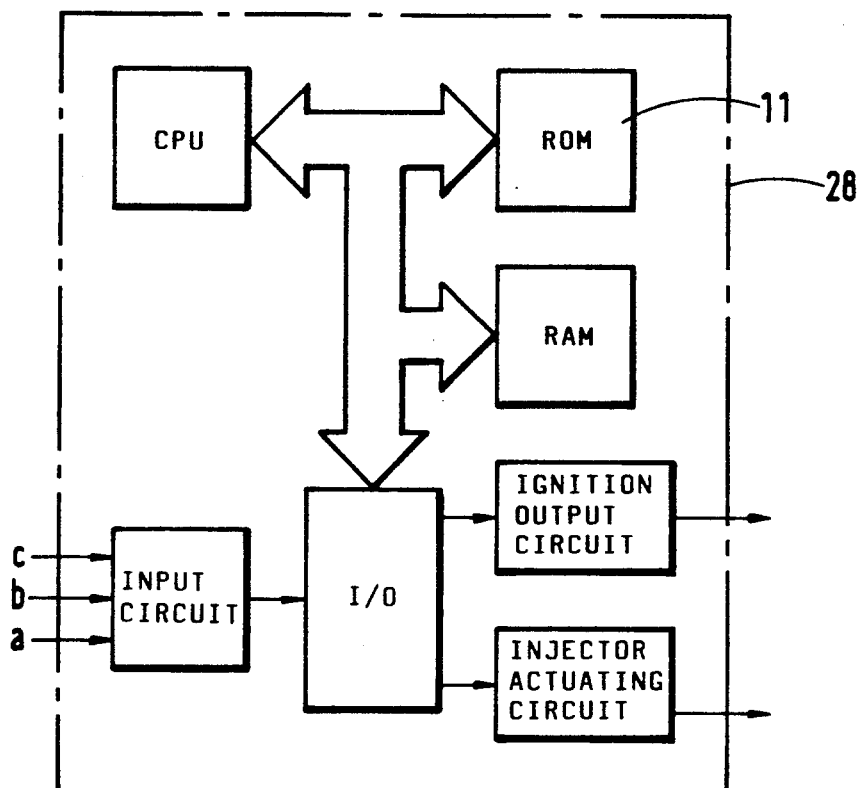
FIG. 3(a) shows a general schematic diagram of an arithmetic circuit used in this invention.

The arithmetic circuit 28 shown in FIG. 3(a) receives as inputs, output c from the cam angle sensor 22, output a from the first magnetic pick-up 16, output b from the second magnetic pick-up 18, and may also receive other output signals from an air-flow sensor, a thermometer in the engine coolent water or the like (which are not shown in the FIG. 2). Based on these data and programs stored in a ROM 11, an optimum control of ignition timing and fuel injection are performed.

Figure 3B:
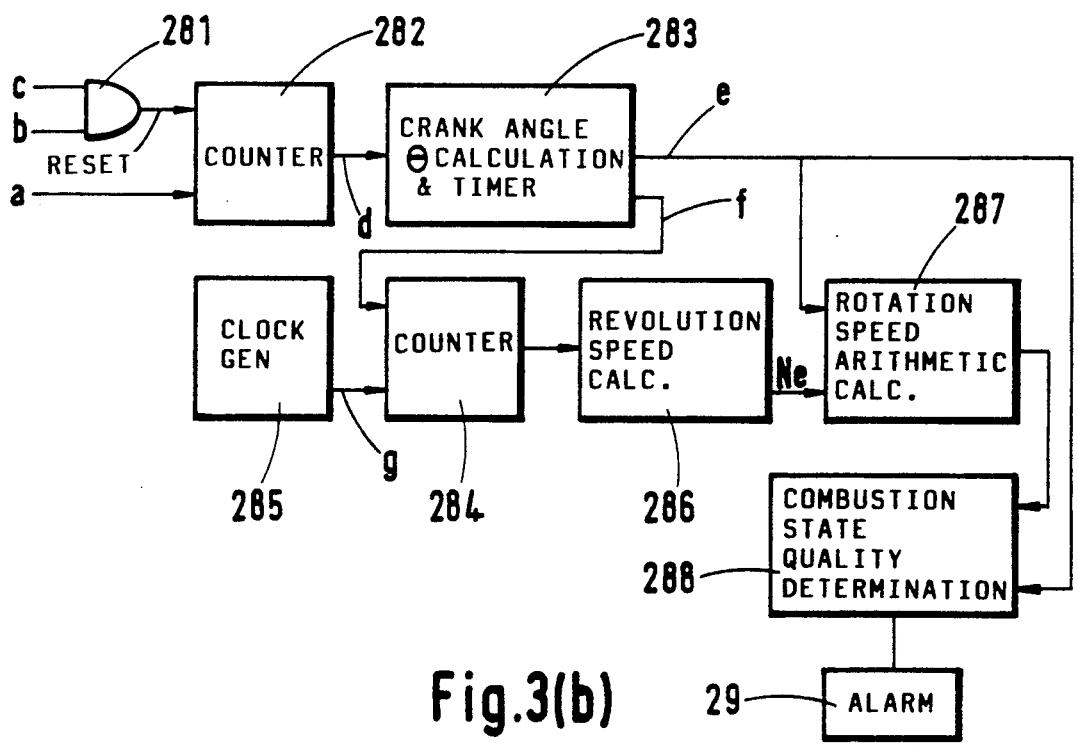
FIG. 3(b) shows a detailed circuit diagram of an arithmetic circuit in the apparatus of FIG. 1, FIGS. 4(a) to (d) show waveforms for explaining the operation of the arithmetic calculation circuit.

FIG. 3(b) shows a detailed configuration of the above-mentioned arithmetic circuit 28, wherein an AND gate 281 is provided having as its two input signals the output signals c from the above cam angle sensor 22 and the output signal b from the above second magnetic pick-up 18, the output terminal of the AND gate being connected to a Reset of a first counter 282. Further, to the other input terminal of the first counter 282 (the lower arrow headed input line in FIG. 3(b)), the output signal a from the above first magnetic pick-up 16 is entered.

The output signal d from the first counter 282 is then fed to a timer circuit 283. The timer circuit 283 is provided with functions of distinguishing between cylinders and of sampling at a given crankshaft angle $\theta$, i.e., the timer circuit 283 generates cylinder identification signal e and a timer signal f (which is the same as the pick-up 18 output b shown in FIG. 4(b) from its two output terminals.

Next, the timer signal f is fed to a second counter 284, to which also a clock signal g is fed from a clock signal generator 285. The second counter 284 counts the clock signal g only while the timer signal f from the timer circuit 283 is being output. The result of counting is then inputted to a revolution speed calculation device 286.

In the rotation speed calculation device 286, a rotation speed Ne is calculated in the following equation (1) based on the results (nc=the number of count) of counting in the counter 284.

$$Ne = K \frac{1}{nc} \quad (1)$$

where, K is a constant.

A rotation speed Ne thus obtained is then fed to a rotation speed arithmetic calculation device 287 wherein calculation for each cylinder is performed. A cylinder identification signal e from the timer circuit 283 is also fed into the cylinder rotation speed arithmetic calculation device 287, wherein the state of variation in rotation speed is determined during the combustion stroke of each cylinder, preferably from top dead center (TDC) of a cylinder of concern to the top dead center (TDC) of the next firing cylinder. That is, in the combustion state determination device 288, a value P is calculated which indicates the height of the second combustion measurement relative to the first and third points so that the degree of an upward convexity representing the variation of rotating speed of each cylinder during its combustion stroke is measured. Further, based on the calculated values of P, it is determined whether the combustion state in each cylinder is good or bad.

If a combustion abnormality in a cylinder of the internal combustion engine 10 is judged to exist, a warning is given to an operator by a combustion abnormality alarm unit 29, or the ignition timing or the amount of injected fuel to an abnormal cylinder may be adjusted for correction or compensation (not shown in the FIG. 3(b)).

Figure 4A:
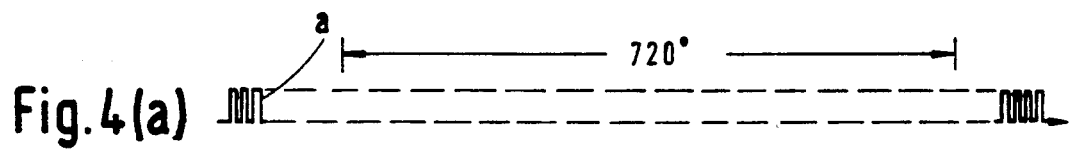
Figure 4B:
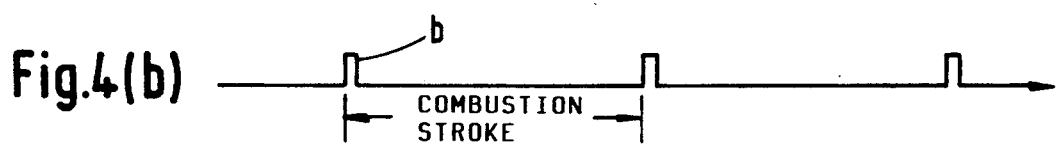
Figure 4C:
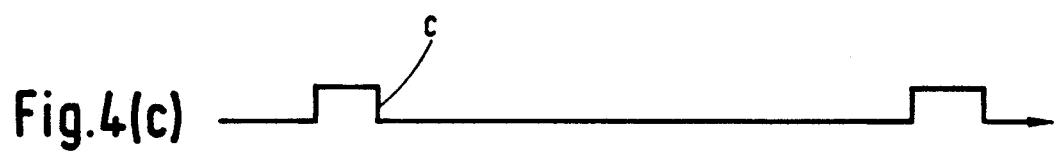
Figure 4D:
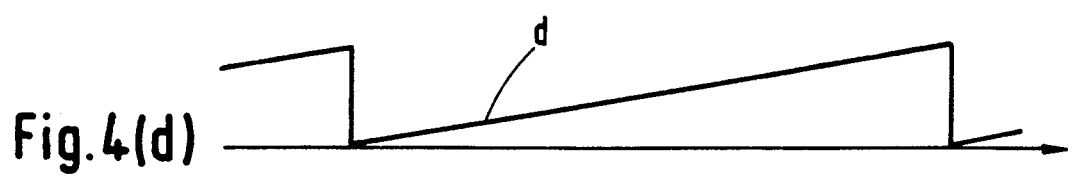

In FIGS. 4(a) to (d), there are shown the waveforms of the output signals from the above-mentioned various types of sensors and their respective timings relative to one another, as well as the number of the count in the counter 282 of the above arithmetic circuit 28. That is, FIG. 4(a) shows the output signal a from the first magnetic pick-up 14, FIG. 4(b) shows the output signal b from the second magnetic pick-up 16, and FIG. 4(c) shows the waveform of the output signal from the cam angle sensor 20. These waveforms from the various sensors are obtained after passing through a waveform shaping circuit not shown in FIG. 4. In addition, the output signal d representing the number of the count in the counter 282, as shown in FIG. 4(d), is reset once per two rotations of the crankshaft 12, or more specifically only when the outputs c and d occur concurrently, thereby changing its value as shown in FIG. 4(d) in synchronism with the operation of the internal combustion engine 10.

FIG. 5 shows the relationship between the combustion stroke of each cylinder in the internal combustion engine 10 and its crank rotation angle. As is apparent from FIG. 5, part of combustion strokes of two adjacent cylinders cross over one another. However, as shown at the bottom of FIG. 5, two rotation angles (720 degrees) of the crankshaft are required for a full cycle of a six cylinder engine with the top dead center (TDC) of each cylinder as an approximate junction point between the cylinders. More specifically, the timer circuit 283 in FIG. 3 allocates the following angle regions so as to discriminate between each cylinder: from 0 to 120 degrees (two rotation angles of the crankshaft) to the first cylinder; an angle region from 120 to 240 degrees to the second cylinder; an angle region from 240 to 360 degrees to the third cylinder; an angle region from 360 to 480 degrees to the fourth cylinder; an angle region from 480 to 600 degrees to the fifth cylinder; and an angle region from 600 to 720 degrees to the sixth cylinder; the angle regions are thus combustion measurement "windows".

FIG. 6 shows the variation of the rotation speed Ne of the internal combustion engine 10, relative to the timing of its detection. That is, the rotation speed Ne of the internal combustion engine 10 minimizes the generated torque in the vicinity of the top dead center (TDC) of each cylinder, and maximizes it in the following combustion stroke. Thereby, because the rotation speed depends on the output of generated torque, a variation as shown in FIG. 6(a) takes place where the first suffix number associated with N denotes the cylinder number and the second suffix number denotes one of the three measurement points. In FIG. 6(b), there are shown the cylinder identification signals e from the timer circuit 283 in FIG. 3(b), i.e. the cylinder undergoing combustion is determined. The timer circuit 283 also outputs a timer signal f for sampling the rotation speed Ne at a given crank angle position. The waveform of the timer signal f is shown in FIG. 6(c), the width of the timing pulses being kept at a constant angle of $\theta s$, for example approximately 24 degrees of the crankshaft angle.

That is, while the timer circuit 283 is outputting the timer signal f, the counter 284 counts the inputted clock signal g from the clock signal generator 285, thereafter outputting the count result to the rotation speed calculation device 286. As a result, the rotation speed calculation device 286 calculates the rotation speed Ne by the equation (1) given above. The calculated rotation speed Ne in combination with the cylinder identification signal e is used to calculate the value of P which shows the convex extent of the upward curve representing the variation in the rotation speed Ne for each combustion stroke of the internal combustion engine 10, in the respective-cylinder rotating speed arithmetic calculation processor device 287.

Further, with regard to the waveform in FIG. 6(a), the sampling timing of the rotation speed Ne for each cylinder during its combustion stroke, i.e. the timing for generating the timer signal f, is set at a minimum of three intervals for convenience' sake, so that two of the three sampling timing periods are shared with the sampling timing period of the adjacent combustion strokes (for example, the first cylinder, whose identification signal e is shown as #1, shares its first sampling timing with the sixth and its third (or last) sampling time with the second cylinders). In this case, the rotation speed Ne is obtained by the following equation.

$$Ne = \frac{\theta s}{6nc \cdot Tc} \text{ (rpm)} \quad (2)$$

where, Tc is a clock cycle(s) of the clock signal generator 285.

Next, P is obtained from the following equation.

$$Pk = Nk_2 - \frac{1}{2}(Nk_1 + Nk_3) \quad (3)$$

where, k denotes a cylinder number ranging from an integer number 1 to 6. The value of Pk has the property of becoming $Pk \approx 0$ when k cylinder is misfiring, while becoming $Pk > 0$ when it is not misfiring. Thereby, by presetting a threshold value $P_{th}$ of P, it becomes possible to make a discrimination between the following two criteria, (i) in case $Pk < P_{th}$: misfiring (abnormality) exists.
(ii) in case $Pk > P_{th}$: no misfiring (normal operation) exists.

In particular, even when the value of Pk is extremely small for a case of no misfiring and it is difficult to preset its threshold value, it is still possible to adequately discriminate between the normal and abnormal combustion states in each cylinder, for example, by increasing the number of detection sampling periods of the rotation speed Ne per cylinder combustion stroke.

Figure 7:
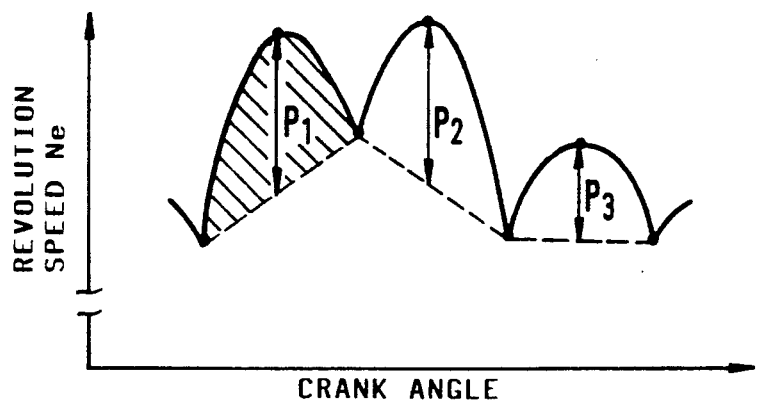
FIG. 7 shows waveforms for explaining the principle of a detection means in another embodiment of the present invention.

Referring to FIG. 7, there is shown a graph having an abscissa of crank angle against an ordinate of rotating speed Ne. The broken line indicates variation in rotation speed due, for example, to change in load or to engine component vibration and the convex curves shown in solid lines indicate the change due to combustion and have a maximum height for cylinders 1-3 indicated by double arrow headed lines $P_1$, $P_2$ and $P_3$ respectively. If, instead of determining the amount of convexness of the rotation speed curve, the area shown cross-hatched in FIG. 7 for cylinder 1 is integrated then the integration value is indicative of the quality of combustion. Thus, if a misfire occurs the integration value will be zero. Thus, it is possible to further improve the precision of discrimination, for example, by averaging the values of several occurrences of Pk.

Figure 8:
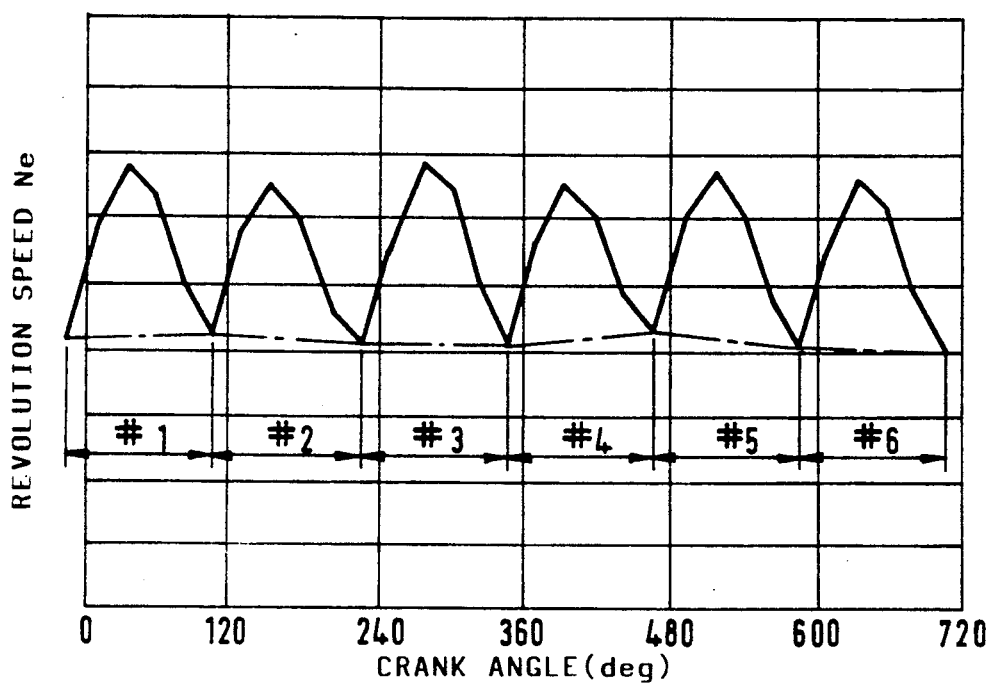
FIGS. 8 and 9 are graphs of actual waveforms showing the state of variation in rotating speeds obtained by using an actual internal combustion engine.
Figure 9:
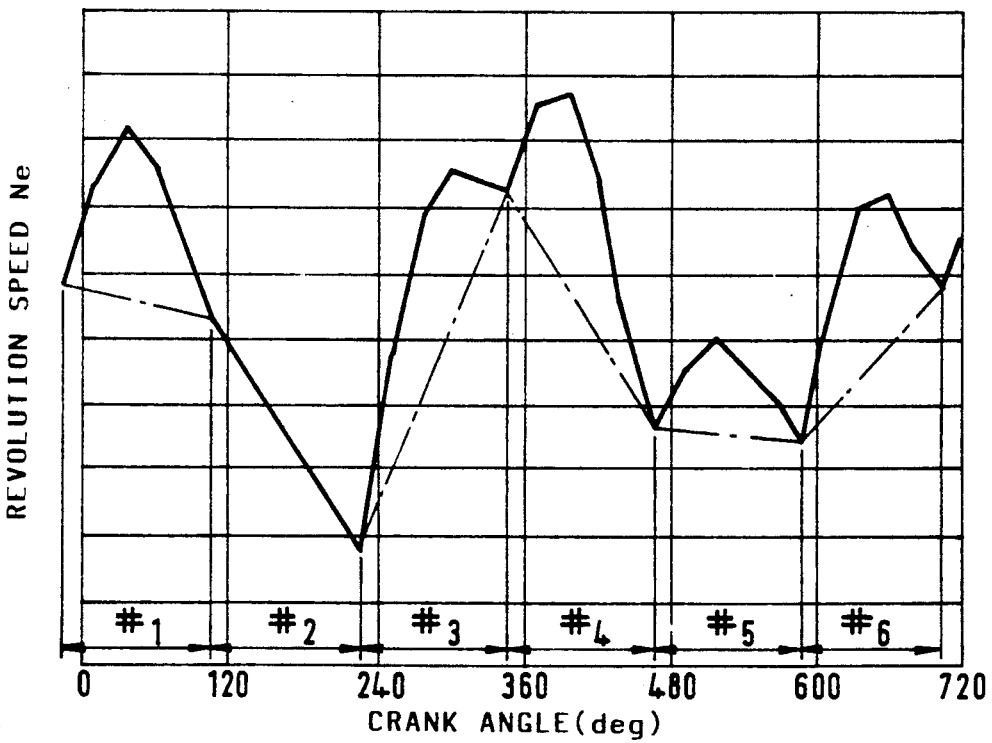

The actual state of variation in the rotating speed Ne observed by using a six cylinder engine is shown in FIG. 8 and FIG. 9. In particular, FIG. 8 shows the state of variation when each cylinder has performed normally, while FIG. 9 shows the state of variation when the number 2 cylinder (#2) has malfunctioned (misfired) and load torque varies. As is clear from the FIGS. 8 and 9, the rotation speed Ne varies so as to have an upward convex curve for the combustion stroke of each cylinder when it is operating normally. In other words, against a chain broken line drawn between the first and the last points of the rotation speed Ne for each cylinder, the values of rotation speed Ne for any other intermediate parts are larger, signifying that fuel injected into each cylinder is combusting normally thereby generating a sufficient torque. On the other hand, when a misfire occurs in one of the plurality of cylinders, for example as shown in the second cylinder (#2), the values of the rotation speed Ne for the forementioned intermediate parts became flat without going over the chain broken line, and even continued to decrease from the latter part of the combustion stroke of the preceding first cylinder, i.e., during the combustion stroke of the second cylinder, no torque is generated.

As is apparent from the above description, with the present invention it is possible to precisely discriminate between a normal combustion and an abnormal combustion in each of a plurality of cylinders of a multi-cylindered internal combustion engine. Further, by making use of this invention, it is possible to solve the problem associated with the irregular combustion state among cylinders, thereby enabling provision of an excellent multi-cylinder internal combustion engine capable of providing a substantially smoothed output or torque.

A feature of this invention which is also believed to be inventive in its own right is now disclosed with reference to FIGS. 10-13 of the accompanying drawings. In the feature of this invention, variations or fluctuations in engine rotation speed caused by fluctuations in reciprocating inertia, such as pistons and the like, are substantially overcome. In this respect, reciprocating inertia caused by pistons and the like, cause a large error in detection of rotation speed at high rotational speeds.

Figure 10:
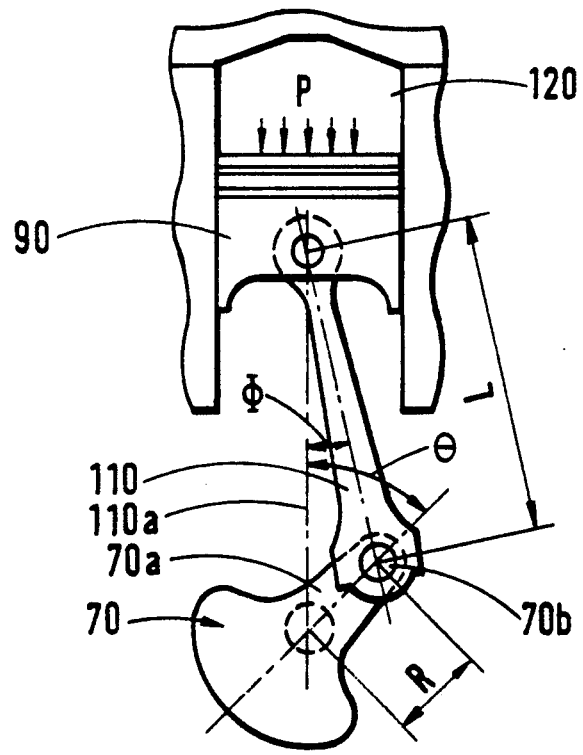
FIG. 10 shows a cross-section of a cylinder and associated piston, crankshaft and connecting rod of an internal combustion engine.

A cross-sectional view of one of cylinders in the internal combustion engine 1 is shown in FIG. 10 in which is located a reciprocatable piston 90, a connection rod 110 and a crankshaft 70. The relative positions of these components to one another is shown in FIG. 10, and especially the angle of the crankshaft member 70a longitudinal axis relative to an imaginary line 110a joining the crankshaft rotational axis to the axis of the so-called little end joining the connecting rod 110 to the piston 90 (hereinafter referred to as a crank angle $\theta$). Torque $t_g$ is generated by pressure P in the combustion chamber 12 of the cylinder, and is conveyed from the cylinder to the crankshaft 70. This torque $t_g$ is a function of the pressure P and the crankshaft angle $\theta$, and is defined by the following equation.

$$t_g(\theta) = R \cdot P \cdot A \cdot \sin(\Phi + \theta)/\cos\Phi \tag{4}$$

where, A is a top surface area of the piston 90 receiving applied pressure, $\Phi$ is an angle between the aforesaid imaginary line 110a and the connecting rod 110 longitudinal axis.

$$\sin\Phi = \frac{R}{L} \sin\theta = K\sin\theta \tag{5}$$

where, R is the radius of rotation of the so-called big end crankpin 70b, and L is the distance between little and big end bearing axes of the connecting rod 110. K is defined as K=R/L.

In the same way, torque $t_i$ which is generated by reciprocating inertia of the piston 90 and the connecting rod is a function of the crankshaft angle $\theta$ and crankshaft rotational speed $\omega$, and is defined by the following equation.

$$t_i(\theta) = -MR^2\omega^2(\cos\theta + K\sin2\theta) \times \frac{\sin(\Phi + \theta)}{\cos\Phi} \tag{6}$$

where, M is the mass of the reciprocating members.

Therefore, torque t produced in a single cylinder is defined by $$t = t_g + t_i \tag{7}$$

Presuming that the j th cylinder in a four-cylinder internal combustion engine is represented by giving a suffix j (j=1, ... 4), the equation (7) can be rewritten as follows.

$$\sum_{j=1}^{4} t_j = \sum_{j=1}^{4} t_{gj} + \sum_{j=1}^{4} t_{ij} \tag{8}$$

where, T, $T_g$, and $T_i$ are defined as follows.

$$T = \sum_{j=1}^{4} t_j, \; T_g = \sum_{j=1}^{4} t_{gj}, \; T_i = \sum_{j=1}^{4} t_{ij} \tag{9}$$

Equation (8) is rewritten as follows.

$$T = T_g + T_i \tag{10}$$

When the rotational speed of the crankshaft 70 is taken as $\omega$, the following equation is obtained.

$$T - Tl = I\frac{d\omega}{dt} \tag{11}$$

where, Tl is the load torque from the clutch side in the FIG. 1, and I is an inertia moment of the rotating system including the crankshaft and components connected directly or indirectly thereto.

The following equation is obtained from equation (11).

$$\omega = \frac{1}{I} \int (T - Tl)dt$$

where $\omega$ is actual measured fluctuation in r.p.m.

$$\omega = \frac{1}{I} \int (T_g - Tl)dt + \frac{1}{I} \int T_i \, dt \tag{12}$$

$\omega_c$ may be defined as follows.

$$\omega_c = \frac{1}{I} \int T_i \, dt \tag{13}$$

where $\omega_c$ is fluctuation in r.p.m. due to reciprocating inertia; $T_i$ is torque inertia.

Equation (13) can be approximated as follows by using equations (9) and (6).

$$\omega_c = \frac{1}{I} \int \sum_{j=1}^{4} t_{ij}(\theta)dt \approx \tag{14}$$

$$\frac{\omega}{I} \int \sum_{j=1}^{4} \left( -MR^2(\cos\theta_j + K\sin2\theta_j) \frac{\sin(\Phi_j + \theta_j)}{\cos\Phi_j} \right) d\theta$$

That is, because $1/I \int \Sigma\{\sim\}d\theta$ is a function of $\theta$, by defining as follows, $$h(\theta) = 1/I \int \Sigma\{\sim\}d\theta \tag{15}$$

the following equation is obtained.

$$\omega_c \approx \omega h(\theta) \tag{16}$$

In practice values of $h(\theta)$ are held in a ROM map.

Also from equations (12) and (13), the following equation is obtained.

$$\frac{1}{I} \int (T_g - Tl)dt = \omega - \omega_c \tag{17}$$

Further, $\omega_g$ is defined as follows.

$$\omega_g = \omega - \omega_c \qquad (18)$$

where $\omega_g$ is fluctuation in r.p.m. caused by combustion—which is the desired quantity.

From equations (17) and (18), the following equation is obtained.

$$T_g - Tl = I\frac{d\omega_g}{dt} \qquad (19)$$

Here, Tl when viewed in relation to an event occurring in an extremely short period of time such as within a single ignition cycle, may be presumed to be constant (except during the stepwise variation of load torque due to the turn on/off of the air conditioner as referred to above, during which the process of combustion state identification may be readily, transiently, stopped). Therefore, by using $\omega_g$, information on $T_g$, i.e., exclusively to combustion state can be obtained. $\omega_g$ is obtained from $\omega_c$, the product of $\omega$ and $h(\theta)$ which is a function of the crankshaft angle $\theta$, as follows:

$$\omega_g = \omega - \omega_c$$

In addition, because $h(\theta)$ is a cyclic function of $\theta$, by pre-calculating $h(\theta)$ mapped data over 360 degrees or 720 degrees, it is unnecessary to calculate $h(\theta)$ every time with a calculation of $\omega_c$.

Further, equation (15) can be re-written as follows.

$$\omega_c \approx \bar{\omega} \cdot h(\theta) \qquad (16')$$

where, $\bar{\omega}$ is an average of values obtained in a given interval of an ignition cycle, defined as $\omega/\bar{\omega} \approx 1$ Hereinabove, has therefore been explained a compensating method for excluding reciprocating inertia. Normally exclusion of such reciprocating inertia often suffices, because its influence is substantially large. When there occurs a necessity to make compensation, for example, for a valve actuator mechanism (not shown in the Figures), by presuming as follows, $$h_1(\theta) = \frac{1}{I} \int \sum_{j=1}^{4}\left(-MR^2(\cos\theta_j + K\sin2\theta_j)\frac{\sin(\Phi_j + \theta_j)}{\cos\Phi_j}\right)d\theta \qquad (15')$$

$h_2(\theta)$ = a torque generated at crank angle $\theta$ by the valve actuator the following equation is derived.

$$\omega_c = \omega \cdot h_1(\theta) + h_2(\theta) \qquad (21)$$

Hereinafter, calculation can be performed by a like process to that referred to above. In this way, once compensating coefficients such as $h_1(\theta)$ for compensating the variation due to reciprocating inertia, and $h_2(\theta)$ for compensating the variation due to elastic forces of a spring or the like are determined, $\omega_c$ and $\omega_g$ can be obtained from equation (21) and equation (18), respectively, providing pertinent combustion state information.

Figure 11:
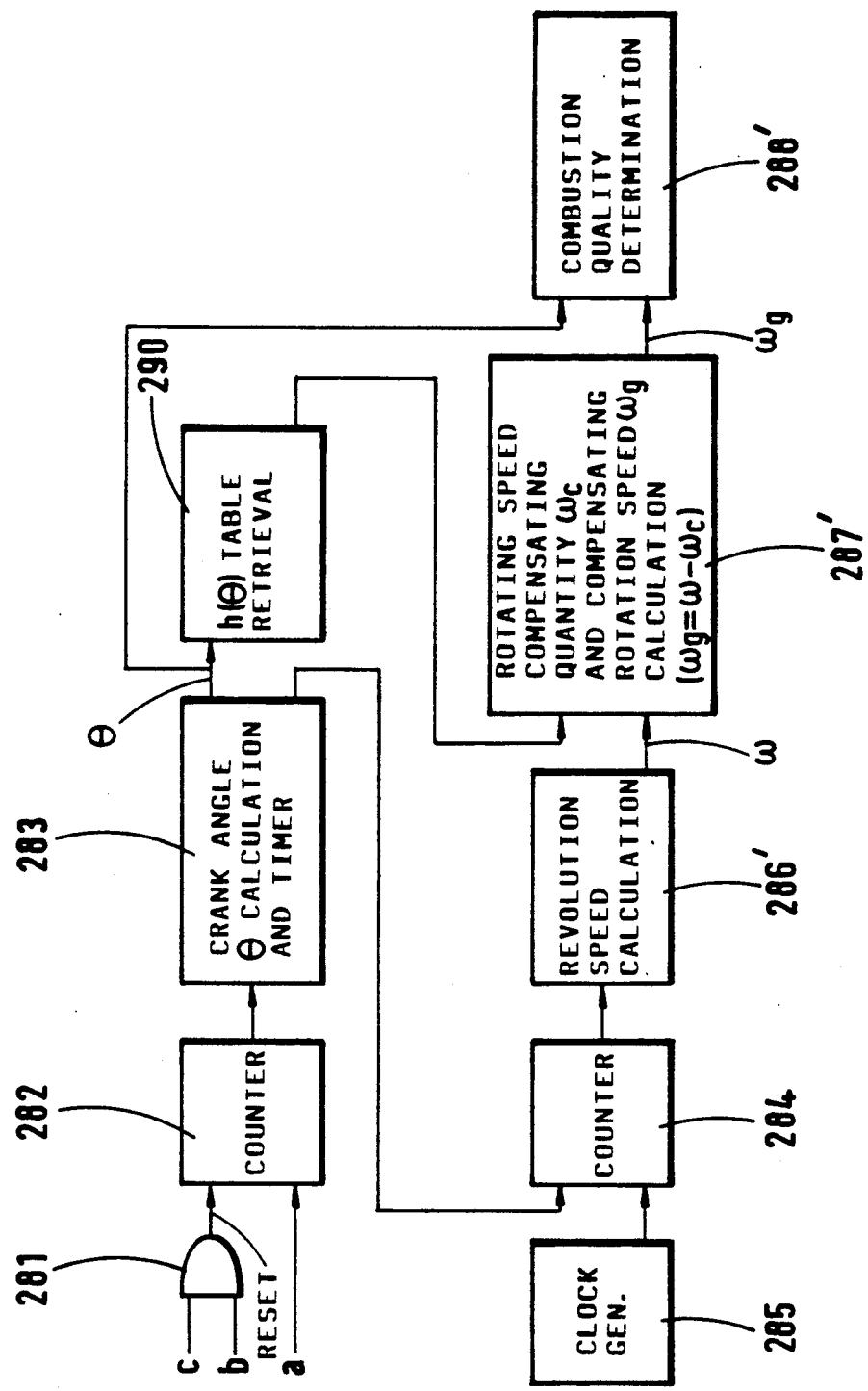
FIG. 11 is a block circuit diagram of the combustion state detection apparatus.
Figure 12A:
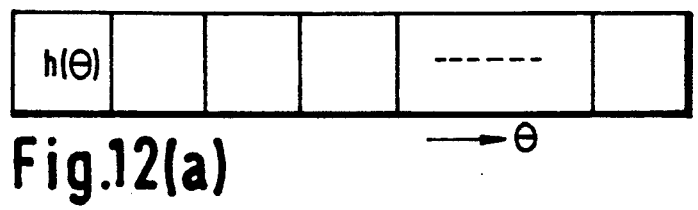
FIGS. 12(a) and 12(b) show tables of compensating coefficients.
Figure 12B:
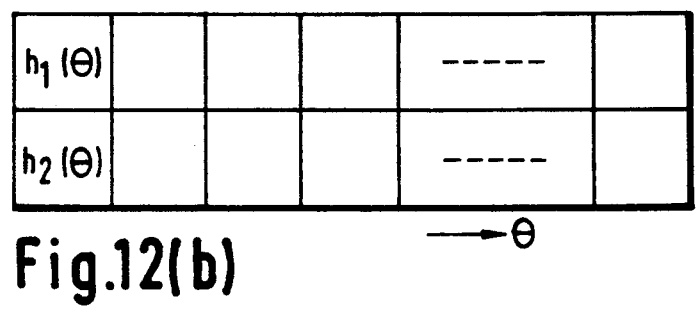

The operation of the apparatus will now be described with reference to FIGS. 4 and 11. As described above, signal c is output from the cam angle sensor 22 once per two rotations of the crankshaft 12 and output signal b is derived from the magnetic pick-up 18 after passing through a waveform shaping circuit (not shown), the same signal being generated once per rotation of the crankshaft and being adjusted to be generated, for example, at a top dead center (TDC) of the first cylinder. The output signal a is derived from the magnetic pickup 16 after passing through a waveform shaping circuit (not shown) and is generated at a given crank angle corresponding to the teeth of the ring gear 14. The waveform d in FIG. 4(d) corresponds to the count of the angle counter 282, and is reset by an AND signal between signals b and c, showing the pulse count number of signal a. From the signal d, a crank angle $\theta$, based, for example, on the top dead center (TDC) of the first cylinder can be detected. The crank angle $\theta$ calculation and sampling timer 283 calculates the crank angle $\theta$ from the counted number as explained above, and outputs a timer signal f for detecting rotating speeds at a given crank angle position. In the counter 284, the signal from the clock 285 is counted only while the timer signal f is being output. Based on the number of the count thereof, a rotating speed $\omega$ is obtained in a rotating speed calculation device 286' which is part of the device 286 shown in FIG. 3(b). Further, in an $h(\theta)$ table retrieval device 290, a pertinent table value $h(\theta)$ is retrieved according to the crank angle $\theta$. The table list may be stored in the ROM 11 as shown in FIGS. 12(a) and 12(b), wherein FIG. 12(a) represents a case where only one kind of $h(\theta)$ is used, for example, as in equation (16), while FIG. 12(b) represents a case where two kinds of $h(\theta)$, as in the equation (21), are used. The $h(\theta)$ table may be stored corresponding to each crankshaft angle at which it is desired to detect the rotating speed $\omega$. $h_1$ and $h_2$ are functions of the dimensions shown in FIG. 10 and vary between different engine models. From $\omega$ and $h(\theta)$ thus obtained, $\omega_g$ can be obtained as described previously in an $\omega_c/\omega_g$ calculation unit 287' which is part of unit 287 shown in FIG. 3(b). Finally in a combustion state determination unit 288' which is part of and supplementary to unit 288 in FIG. 3(b), an ongoing combustion state, i.e. quality of combustion, is identified from the $\omega_g$ and the corresponding crank angle $\theta$. As for the means of identification or discrimination, time differentiation as practiced in equation (19), or other means known per se may be used.

Figure 13:
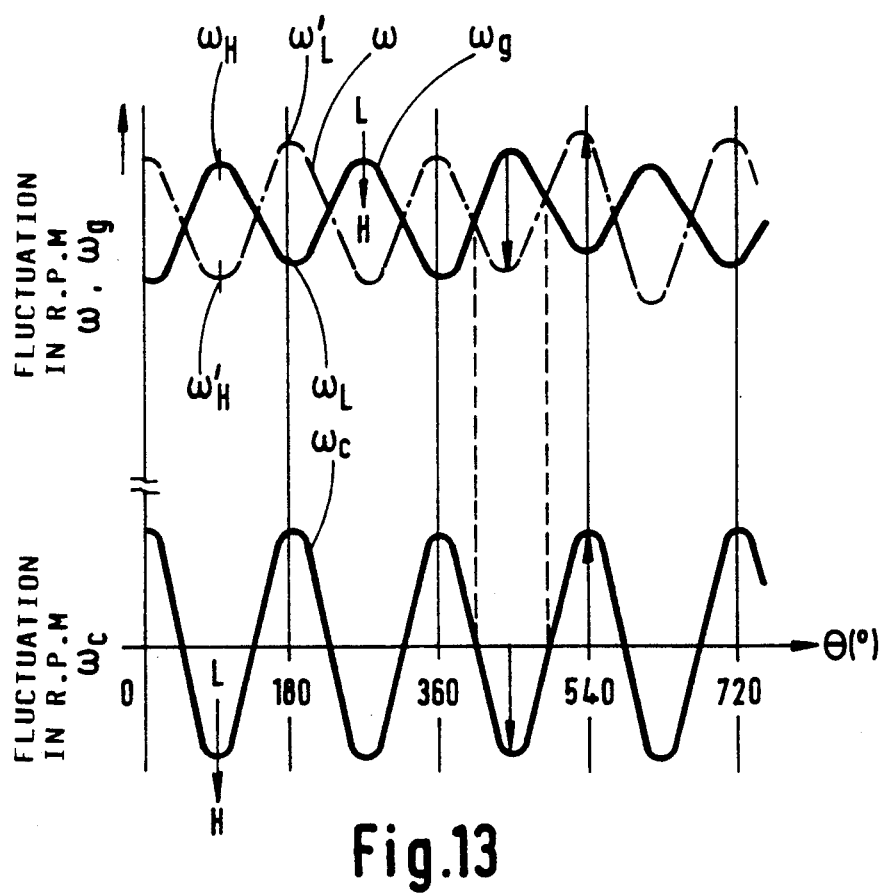
FIG. 13 shows examples of rotational speed data for explaining the effects of the feature of the present invention.

FIG. 13 shows an example of rotating speed data taken for an actual 4-cylinder internal combustion engine. $\theta = 0$ degrees was adjusted to the top dead center (TDC) detonation for the first cylinder. Operational conditions were set at a high speed, whereat the large influence of reciprocating inertia was readily observed. For example, when the rotating speeds are detected by the prior art at 90 degrees, 180 degrees, ... of the TDC, in order to detect the maximum and the minimum speeds within a single ignition cycle, there sometimes occurs a reversion in relation to magnitude such that the maximum rotating speed equals $\omega'H$, and the minimum rotating speed equals $\omega'L$.

In FIG. 13, crankshaft angle $\theta$ is shown against an ordinate of fluctuation in engine r.p.m. In the upper graph of FIG. 13 the reverse $\omega_H$ to $\omega'_H$ and from $\omega_L$ to $\omega'_L$ is indicated where $\omega_H$ and $\omega_L$ denote the maximum and minimum rotating speeds respectively. In the FIG. 13, $\omega$ denotes the measured fluctuation in r.p.m. which includes fluctuation in combustion r.p.m. $\omega_g$ plus fluctuation in r.p.m. due to reciprocation inertia $\omega_c$. $\omega_g$ diminishes at higher speeds whereas $\omega_c$, as shown in the lower graphical representations of FIG. 13, increases at higher speeds. The ordinate axes in FIG. 13 are drawn to the same scale and it is, thus, shown that $\omega_c$ is the larger component in measurement of $\omega$. $\omega_g$ obtained by the present invention is observed from FIG. 13 to accelerate from $\theta=0°$, reaching the maximum rotating speed at $\theta=180°$ whereat the next ignition cycle starts, thereby demonstrating that the pertinent combustion information is being successfully extracted.

By using the inventive feature of the present invention pertinent combustion information is detected from the rotating speeds. Conventional combustion state detection methods which are limited in their validity and reliability to only a low rotation speed range may be extended to a full scale range rotation speed detection, when installed with the rotation detection apparatus of the feature of the present invention. Further, a quantitative detection of the combustion state can be made by the subject invention which greatly improves combustion state detection precision, consequently leading to improvements in fuel consumption, exhaust gas cleaning technology and the like, and thereby to, for example, clean-burn technologies, malfunction diagnosis or the like.

It is to be understood that the invention has been described with reference to exemplary embodiments, and modifications may be made without departing from the spirit and scope of the invention as defined in the appended claims.

We claim:

1. A method of determining the quality of combustion in each cylinder of a multi-cylinder internal combustion engine comprising the steps of:
   a) determining a combustion stroke of each cylinder,
   b) determining a rotational speed of an engine at least at top dead center of a first cylinder, at top dead center of a second cylinder which is the next cylinder to said first cylinder to fire, and at a time intermediate the top dead center of said first and second cylinders and providing signals representative thereof,
   c) determining fluctuation in the rotational speed of said engine from said signals to provide a signal $\omega$,
   d) reading a memory means, storing coefficient data $h(\theta)$ which is a function of an angle of a crankshaft of said engine,
   e) calculating engine rotational fluctuation caused by reciprocating inertia to provide a signal $\omega_c$ by determining an average of values of rotational speed fluctuation $\bar{\omega}$ in a given interval of an ignition cycle of said engine and calculating said signal $\omega$ by multiplying the average values of rotational speed fluctuation $\bar{\omega}$ by said coefficient data $h(\theta)$,
   f) calculating the difference between the signals $\omega$ and $\omega_c$, and
   g) using said difference calculated in step f) to indicate the quality of combustion based substantially only upon fluctuation in detected speeds $\omega_g$ caused by combustion.

2. A method as claimed in claim 1 wherein said engine rotational speeds are detected proximate to the beginning and end of each cylinder combustion stroke and at a time intermediate thereof.

3. A method as claimed in claim 1 wherein said intermediate time is approximately half-way between the top dead center of said first and second cylinders.

4. A method as claimed in claim 1 wherein said rotational speeds are detected at the beginning and end of a combustion stroke and at an intermediate point thereof, and the height of a rotational speed characteristic at said intermediate point above an imagined straight line drawn between the rotational speeds at the beginning and end of combustion is indicative of the quality of combustion.

5. A method as claimed in claim 1 wherein said rotational speeds are detected at the beginning and end of a combustion stroke and at an intermediate point thereof, and the area under a rotational speed characteristic relative to an imagined straight line drawn between the rotational speeds at the beginning and end of combustion is indicative of the quality of combustion.

6. An apparatus for detecting the quality of combustion in each cylinder of a multi-cylinder internal combustion engine comprising detecting means for detracting a combustion stroke of each cylinder and for producing a signal thereupon, determining means connected to receive said signal from said detecting means indicative of said combustion stroke, said determining means detecting the rotational speed of said engine and including crankshaft angular position sensor means for providing an output signal at (a) top dead center of a first cylinder, (b) at top dead center of a second cylinder which is the next cylinder to said first cylinder to fire, and (c) at a time intermediate the top dead center of said first and second cylinders, means using the output signal of said sensor means for determining fluctuation in the rotational speed of said engine to provide a signal $\omega$, memory means for storing coefficient data $h(\theta)$ that is a function of an angle of a crankshaft of said engine, means for accessing said memory means and for calculating engine rotational fluctuation caused by reciprocating inertia to provide a signal $\omega_c$, said means for accessing said memory means and for calculating engine rotational fluctuation to provide said signal $\omega_c$ including means for providing an average of values of rotational speed fluctuation $\bar{\omega}$ in a given interval of an ignition cycle and means for calculating said signal $\omega_c$ by multiplying said values $\bar{\omega}$ by said coefficient data $h(\theta)$, means for calculating the difference between said signal $\omega$ and said signal $\omega_c$ to indicate the quality of combustion of said engine based substantially only upon fluctuation in detected rotational speeds $\omega_g$ caused by combustion, and means for using said indication of said quality of combustion.

7. A method as claimed in claim 6 wherein said memory means also stores data $h_2(\theta)$ representative of engine rotation fluctuation caused by elastic forces in the engine.

* * * * *